US011597235B2

(12) United States Patent
Abell

(10) Patent No.: US 11,597,235 B2
(45) Date of Patent: Mar. 7, 2023

(54) METHODS RELATING TO POLYURETHANE FOAM-CONTAINING AND DEGRADABLE FOAM-CONTAINING TIRES, AND DEGRADABLE FOAM-CONTAINING TIRES

(71) Applicant: Bridgestone Americas Tire Operations, LLC, Nashville, TN (US)

(72) Inventor: Joshua P. Abell, Franklin, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 1014 days.

(21) Appl. No.: 16/367,904

(22) Filed: Mar. 28, 2019

(65) Prior Publication Data

US 2019/0225017 A1    Jul. 25, 2019

Related U.S. Application Data

(62) Division of application No. 15/746,716, filed as application No. PCT/US2016/042277 on Jul. 14, 2016, now Pat. No. 10,245,887.

(60) Provisional application No. 62/196,099, filed on Jul. 23, 2015.

(51) Int. Cl.

| | | |
|---|---|---|
| B60C 1/00 | (2006.01) | |
| B60C 19/00 | (2006.01) | |
| B60C 7/10 | (2006.01) | |
| C08G 18/72 | (2006.01) | |
| C08J 11/28 | (2006.01) | |
| C08K 5/00 | (2006.01) | |
| B60C 5/00 | (2006.01) | |
| C08K 5/49 | (2006.01) | |
| C08K 5/5317 | (2006.01) | |
| C08J 9/35 | (2006.01) | |
| C08K 5/5337 | (2006.01) | |
| C08L 75/04 | (2006.01) | |

(52) U.S. Cl.
CPC ............. B60C 1/0016 (2013.01); B60C 1/00 (2013.01); B60C 1/0025 (2013.01); B60C 5/002 (2013.01); B60C 7/1015 (2021.08); C08G 18/72 (2013.01); C08J 9/35 (2013.01); C08J 11/28 (2013.01); C08K 5/0033 (2013.01); C08K 5/49 (2013.01); C08K 5/5317 (2013.01); C08K 5/5337 (2013.01); C08L 75/04 (2013.01); B60C 2001/0091 (2013.01); C08G 2110/0008 (2021.01); C08G 2380/00 (2013.01); C08J 2375/04 (2013.01); C08L 2203/14 (2013.01)

(58) Field of Classification Search
CPC .............................. B60C 7/1015; B60C 19/002
See application file for complete search history.

(56) References Cited

U.S. PATENT DOCUMENTS

| | | | |
|---|---|---|---|
| 4,044,046 A | 8/1977 | Kondo et al. | |
| 4,317,939 A | 3/1982 | Gerlock et al. | |
| 4,416,844 A | 11/1983 | Wyman | |
| 4,476,251 A | 10/1984 | Cianciolo et al. | |
| 4,849,467 A | 7/1989 | Shorr et al. | |
| 5,183,514 A | 2/1993 | Marquis | |
| 6,432,864 B1 | 8/2002 | Wendel et al. | |
| 8,387,670 B2 * | 3/2013 | Tanno ................... | B60C 19/002 |
| | | | 152/157 |
| 2004/0077741 A1 | 4/2004 | Knop et al. | |
| 2007/0077741 A1 | 3/2007 | Sandstrom et al. | |

FOREIGN PATENT DOCUMENTS

| | | |
|---|---|---|
| BG | 100389 A | 4/1984 |
| JP | 54-30296 A | 3/1979 |
| JP | 60-19436 A | 9/1985 |
| JP | 60-19437 A | 9/1985 |
| JP | 2005001628 A | 1/2005 |
| JP | 2009167248 A | 7/2009 |
| KR | 100644998 B1 | 11/2006 |
| KR | 10-1012185 B1 | 2/2011 |
| WO | 2005007379 A1 | 1/2005 |

OTHER PUBLICATIONS

Chen, Ming-Jun, et al., "Influence of valence and structure of phosphorous-containing melamine salts on the decomposition and fire behaviors of flexible polyurethane foams," Industrial and Engineering Chemical Research, vol. 53, n. 21 (May 28, 2014), pp. 8773-8783.

International (PCT) Search Report and Written Opinion from PCT/US2016/042277, dated Oct. 2016, 11 pages.

International Preliminary Report on Patentability from PCT/US2016/042277, dated Jan. 2018, 7 pages.

"How do I remove wheel from the foam fill?" downloaded from http://flatproofing.com/technical-tips/tim-salvaging on Oct. 13, 2014, copyright 2011-2014 Flatproofing.com (3 pages).

"got flats? TyrFilTM" downloaded from the internet Oct. 2014 (1 page).

Wikipedia entry on polyurethane downloaded from the internet May 15, 2015 (9 pages).

"Tire Flatproofing" downloaded from http://flatproofing.com/products/tire-flatproofing/ on Oct. 13, 2014, copyright 2011-2014 Flatproofing com (2 pages).

(Continued)

*Primary Examiner* — Vickey Nerangis
(74) *Attorney, Agent, or Firm* — Meredith E. Hooker; Jenny L. Sheaffer

(57) ABSTRACT

Disclosed herein are methods for degrading polyurethane foam from mounted polyurethane foam-containing tires, methods for separating a wheel from a mounted polyurethane foam-containing tire, methods for preparing a degradable foam-containing tire, and degradable foam-containing tires. The methods include applying a solution comprising at least one phosphorous oxoacid or an ester thereof to the polyurethane foam inside of a tire, incorporating a degradant comprising at least one phosphorous oxoacid or an ester thereof into the polyurethane foam, or both, and then heating to degrade the foam. Degradation of the foam allows for separation of the wheel from the rubber carcass of the tire.

20 Claims, No Drawings

(56) References Cited

OTHER PUBLICATIONS

Molero, Carolina et al., "Kinetics and Mechanism of the Chemical Degradation of Flexible Polyurethane Foam Wastes with Dimethyl H-phosphonate with Different Catalysts," J. of Macromolecular Science, Part A: Pure and Applied Chemistry, vol. 47 (2010), pp. 983-990.

Troev, K., et al., "Recycling of Polyurethanes. Degradation of Microporous and Flexible Polyurethanes by Phosphonic Acid Diesters," 1999, pp. 71-74.

Troev, K., et al., "Chemical degradation of polyurethanes. 2. Degradation of flexible polyether foam by dimethyl phosphonate," Polymer Degradation and Stability, v. 67, n. 3 (Mar. 1, 2000), pp. 397-405.

Troev, K., et al., "Chemical degradation of polyurethanes. Degradation of microporous polyurethane elastomer by dimethyl phosphonate," Polymer Degradation and Stability, v. 67, n. 1 (Jan. 2000), pp. 159-165.

Troev, K., et al., "Chemical degradation of polyurethanes. 3. Degradation of microporous polyurethane elastomer by diethyl phosphonate and tris(1-methyl-2-cholorethyl)phosphonate," Polymer Degradation and Stability, v. 70, n. (Oct. 1, 2000), pp. 43-48.

Grancharov, Georgi, "Smart polymer recycling: Synthesis of novel rigid polyurethanes using phosphorous-containing oligomers formed by controlled degradation of microporous polyurethane elastomer," J. of Applied Polymer Science, vol. 105, n. 2 (Jul. 15, 2007), pp. 302-308.

Troev, K., et al., "A novel approach to recycling of polyurethanes: Chemical degradation of flexible polyurethane foams by triethyl phosphate," Polymer, vol. 41, n. 19 (Sep. 2000), pp. 7017-7022.

Troev, K., et al., "Erratum: A novel approach to recycling of polyurethanes," Polymer, vol. 42, n. 12 (2001), pp. 5501-5502.

Troev, K., et al., "Chemical degradation of polyurethanes: Degradation of flexible polyester polyurethane foam by phosponic acid dialkyl esters," J. of Applied Polymer Science, vol. 78, n. 14 (Dec. 2000), pp. 2565-2573.

Chattopadhyay, D.K., et al., "Thermal stability and flame retardancy of polyurethanes," Progress in Polymer Science (Oxford), vol. 34, n. 10 (Oct. 2009), pp. 1068-1133.

Chang, T.C., et al., "Degradation of phosphorous-containing polyurethanes," Polymer Degradation and Stability, vol. 47, n. 3 (1995), pp. 375.

Grassie, Norman, et al., "Synthesis and Degradation of Polyurethanes Containing Phosphorous-2. Thermal Degradation of Poly(Butylene Phenylphosphonate) and Poly(Butylene PhenylPhosphonate) Bis (PhenylCarbamate)," Polymer Degradation and Stability, vol. 5, No. 1, (Jan. 1983), pp. 43-53.

Liang, Shuyu, et al., "Flame retardency and thermal decomposition of flexible polyurethane foams: Structural influence of organophosphorous compounds," Polymer Degradation and Stability, vol. 97, n. 11 (Nov. 2012), pp. 2428-2440.

\* cited by examiner

METHODS RELATING TO POLYURETHANE FOAM-CONTAINING AND DEGRADABLE FOAM-CONTAINING TIRES, AND DEGRADABLE FOAM-CONTAINING TIRES

CROSS-REFERENCE TO RELATED APPLICATIONS

This application is a divisional of U.S. application Ser. No. 15/746,716 filed Jan. 23, 2018, which is a U.S. national stage of International Application No. PCT/US2016/0422777, filed Jul. 14, 2016, which claims priority to U.S. Provisional Application Ser. No. 62/196,099, filed Jul. 23, 2015, all of which are hereby incorporated by reference in their entirety.

FIELD

The present application is directed to methods for degrading polyurethane foam from mounted polyurethane foam-containing tires, methods for separating a wheel from a mounted polyurethane foam-containing tire, methods for preparing a degradable foam-containing tire, and degradable foam-containing tires.

BACKGROUND

The addition of polyurethane foam to pneumatic tires can provide certain advantages such as improved tread wear and elimination of flat tires from punctures. However, the presence of the polyurethane foam inside the tire presents certain challenges when the foam-filled tire reaches the end of its life and needs to be separated from the wheel.

SUMMARY

Disclosed herein are methods for degrading polyurethane foam from mounted polyurethane foam-containing tires, methods for separating a wheel from a mounted polyurethane foam-containing tire, methods for preparing a degradable foam-containing tire, and degradable foam-containing tires.

In a first embodiment, a method for degrading polyurethane foam from inside of a tire is provided. The method comprises providing a solution comprising at least one phosphorous oxoacid or an ester thereof, providing a mounted tire comprising a wheel and a rubber carcass and having polyurethane foam inside the rubber carcass, applying the solution to the polyurethane foam inside the carcass, and heating to degrade the polyurethane foam.

In a second embodiment, a method for separating a wheel from a polyurethane foam-containing tire by degrading the foam is provided. The method comprises providing a mounted tire comprising a wheel and a rubber carcass with polyurethane foam inside the rubber carcass, applying a solution comprising at least one phosphorous oxoacid or an ester thereof to the polyurethane foam inside the rubber carcass, heating to degrade the polyurethane foam, and separating the wheel from the rubber carcass.

In a third embodiment, a method for separating a wheel from a mounted polyurethane foam and degradant-containing tire by degrading the foam is provided. The method comprises: providing a mounted tire comprising a wheel and a rubber carcass with polyurethane foam inside the rubber carcass wherein the polyurethane foam includes a degradant comprising at least one phosphorous oxoacid or an ester thereof, optionally applying a solution comprising at least one phosphorous oxoacid or an ester thereof to the polyurethane foam inside the rubber carcass, heating to degrade the polyurethane foam, and separating the wheel from the rubber carcass.

In a fourth embodiment, a method for preparing a degradable foam-containing tire is provided. The method comprises providing a tire comprising at least a wheel, a rubber carcass, and a valve stem; combining ingredients comprising: (i) at least one di- or polyisocyanate, (ii) at least one polyol, and (iii) a degradant comprising at least one phosphorous oxoacid or an ester thereof; and adding the combined ingredients into the rubber carcass through the valve stem, whereby the added combined ingredients form a degradable foam-containing tire comprising foam that is capable of degradation upon heating to a temperature above about 120° C.

In a fifth embodiment, a tire containing degradable foam is provided. The tire comprises (a) a wheel, a rubber carcass comprising at least a tread portion and a sidewall portion, and optionally a valve stem, and (b) degradable foam comprised of a combination of at least one di- or polyisocyanate, at least one polyol, and a degradant comprising at least one phosphorous oxoacid or an ester thereof, the degradable foam contained in the interior of the rubber carcass, wherein the degradable foam is capable of degradation upon heating to a temperature above about 120° C.

DETAILED DESCRIPTION

Disclosed herein are methods for degrading polyurethane foam from mounted polyurethane foam-containing tires, methods for separating a wheel from a mounted polyurethane foam-containing tire, methods for preparing a degradable foam-containing tire, and degradable foam-containing tires.

In a first embodiment, a method for degrading polyurethane foam from inside of a tire is provided. The method comprises providing a solution comprising at least one phosphorous oxoacid or an ester thereof, providing a mounted tire comprising a wheel and a rubber carcass and having polyurethane foam inside the rubber carcass, applying the solution to the polyurethane foam inside the carcass, and heating to degrade the polyurethane foam.

In a second embodiment, a method for separating a wheel from a mounted polyurethane foam-containing tire by degrading the foam is provided. The method comprises providing a mounted tire comprising a wheel and a rubber carcass with polyurethane foam inside the rubber carcass, applying a solution comprising at least one phosphorous oxoacid or an ester thereof to the polyurethane foam inside the tire, heating to degrade the polyurethane foam, and separating the wheel from the rubber carcass.

In a third embodiment, a method for separating a wheel from a mounted polyurethane foam and degradant-containing tire by degrading the foam is provided. The method comprises: providing a mounted tire comprising a wheel and a rubber carcass with polyurethane foam inside the rubber carcass wherein the polyurethane foam includes a degradant comprising at least one phosphorous oxoacid or an ester thereof, optionally applying a solution comprising at least one phosphorous oxoacid or an ester thereof to the polyurethane foam inside the rubber carcass, heating to degrade the polyurethane foam, and separating the wheel from the rubber carcass. According to the method of the third embodiment, a degradant comprising at least one phosphorous oxoacid or an ester thereof is incorporated into the polyurethane foam such that the step of separating the wheel from the mounted tire may be accomplished without the need for application of a solution comprising at least one phosphorous oxoacid or an ester thereof to the polyurethane foam inside the rubber carcass. However, in certain embodiments of the methods of the third embodiment, additional phosphorous oxoacid or an ester thereof may be utilized in the form of a solution applied to the polyurethane foam inside the rubber carcass; in such embodiments, the additional phosphorous oxoacid or an ester thereof may provide more rapid or otherwise improved degradation of the foam as compared to heating alone.

In a fourth embodiment, a method for preparing a degradable foam-containing tire is provided. The method comprises providing a tire comprising at least a wheel, a rubber carcass, and a valve stem; combining ingredients comprising: (i) at least one di- or polyisocyanate, (ii) at least one polyol, and (iii) a degradant comprising at least one phosphorous oxoacid or an ester thereof; and adding the combined ingredients into the rubber carcass through the valve stem, whereby the added combined ingredients form a degradable foam-containing tire comprising foam that is capable of degradation upon heating to a temperature above about 120° C.

In a fifth embodiment, a tire containing degradable foam is provided. The tire comprises (a) a wheel, a rubber carcass comprising at least a tread portion and a sidewall portion, and optionally a valve stem, and (b) degradable foam comprised of a combination of at least one di- or polyisocyanate, at least one polyol, and a degradant comprising at least one phosphorous oxoacid or an ester thereof, the degradable foam contained in the interior of the rubber carcass, wherein the degradable foam is capable of degradation upon heating to a temperature above about 120° C.

Definitions

The terminology as set forth herein is for description of the embodiments only and should not be construed as limiting the invention as a whole.

As used herein the terms "degrade," "degraded," and "degrading" (e.g., degrading the foam or degraded foam) is intended to encompass entirely changing the polyurethane foam inside the rubber carcass from a solid into a pourable liquid as well as changing a portion of the polyurethane foam inside the rubber carcass from a solid into a pourable liquid. In other words, these terms should be understood to encompass changing a sufficient portion of the polyurethane foam inside the rubber carcass from a solid into a pourable liquid to achieve separation of the wheel from the rubber carcass and the polyurethane foam. Degrading of the entire volume of polyurethane foam from a solid into a pourable liquid is not necessarily required to achieve the separation. Moreover, a pourable liquid may include pieces or chunks of undegraded polyurethane foam. As non-limiting examples, ice water would be considered a pourable liquid whereas mayonnaise at 5° C. would not be considered a pourable liquid.

As used herein, the term "mounted" (i.e., mounted tire) is used to describe a tire that is connected to a wheel, the connection may be, but is not necessarily, sufficient for use of the mounted tire on a vehicle.

As used herein, the term "phosphorous oxoacid" is used herein to describe a pnictogen oxoacid which contains phosphorus and oxygen, at least one hydrogen atom bound to oxygen, and forms an ion by the loss of one or more protons.

As used herein, the term "oxoacid" is used to describe a compound which contains oxygen, at least one other element, and at least one hydrogen bound to oxygen, and which produces a conjugate base by loss of positive hydrogen ion(s).

As used herein, the terms "ester of a phosphorous oxoacid" and "phosphorous oxoacid ester" are used interchangeably to describe an ester formed from a phosphorous oxoacid by replacing the hydrogen on at least one —OH group with an R group where R is an alkyl group optionally substituted with halogen (i.e., halogenated alkyl), or an aromatic group optionally substituted with halogen.

Polyurethane Foam

As discussed above, the methods of the first and second embodiments disclosed herein involve a mounted tire comprising a wheel and a rubber carcass with polyurethane foam inside the rubber carcass and the method of the third embodiment disclosed herein involves a mounted tire comprising a wheel and a rubber carcass with polyurethane foam that includes a degradant inside the rubber carcass. Such a mounted tire can also be described herein as a mounted polyurethane foam-containing tire. The polyurethane foam (including the degradant of the third embodiment) added to the inside of the rubber carcass is generally added after the tire has been mounted onto the wheel, but the methods of the first and second embodiments are not limited to polyurethane foam-containing tires that have had foam added by any particular method. Generally, polyurethane foams are based upon (comprise) a first component comprising at least one di- or polyisocyanate and a second component comprising at least one polyol, and the polyurethane foam present inside the rubber carcass of the tire may comprise a first component comprising at least one di- or polyisocyanate and a second component comprising at least one polyol. As discussed above, the method of the fourth embodiment is for preparing a degradable foam-containing tire and includes combining ingredients comprising such a first component and a second component (along with a degradant) and the tire of the fifth embodiment contains a degradable foam comprised of a combination of ingredients comprising such a first component and a second component (along with a degradant). However, when utilized with tires, the polyurethane foam or degradable foam may also comprise one or more of the following either as a component of the foam when added to the rubber carcass or as a result of leaching from the rubber carcass: one or more oils (e.g., hydrocarbon, mineral or plant oil), one or more fillers (e.g., carbon black, silica), rubber particles, or other small molecules present in the rubber carcass. In certain embodiments of the methods of the first, second, third and fourth embodiments disclosed herein and of the tire of the fifth embodiment, the polyurethane foam or the degradable foam may comprise one or more of the following: one or more stabilizers (e.g., antioxidants, UV stabilizers), one or more fillers (e.g., fiberglass, carbon black, or silica), or one or more plasticizers.

According to the methods of the third embodiment disclosed herein, the polyurethane foam inside the rubber carcass of the mounted tire includes a degradant comprising at least one phosphorous oxoacid or an ester thereof. In other words, a degradant in the form of at least one phosphorous oxoacid or an ester thereof has been incorporated into the polyurethane foam during formation of the foam. The polyurethane foam that includes a degradant may also be referred to as a "degradable foam" or alternatively as a "heat degradable foam." Inclusion of the degradant in the form of at least one phosphorous oxoacid or an ester thereof allows for degradation of the polyurethane foam simply by heating (e.g., to a temperature of at least about 120° C. as described below). Optionally, according to the method of the third embodiment, a solution comprising at least one phosphorous oxoacid or an ester thereof is applied to the polyurethane foam inside the rubber carcass; in such embodiments, the additional phosphorous oxoacid or an ester thereof may provide more rapid or otherwise improved degradation of the foam as compared to heating alone.

Phosphorous Oxoacid or an Ester Thereof

As discussed above, according to the methods of the first and second embodiments and in certain embodiments of the methods of the third embodiment, a solution comprising at least one phosphorous oxoacid or an ester thereof is used for degrading the polyurethane foam inside the rubber carcass of the tire. As also discussed above, according to the methods of the third and fourth embodiments and according to the fifth embodiment, a degradant comprising at least one phosphorous oxoacid or an ester thereof is included in the degradable foam when it is formed. As those of skill in the art will understand various chemical moieties can constitute the at least one phosphorous oxoacid or an ester thereof. Generally, phosphorous is capable of various oxidation states including +1, +2, +3, +4 and +5 as well as mixed oxidation states (e.g., interchanging between +3 and +5, or containing more than one P with at least one P in one oxidation state and at least one other P in another oxidation state). In certain embodiments of the first-fifth embodiments disclosed herein, the solution comprises or the degradant comprises at least one phosphorous oxoacid or an ester thereof wherein the phosphorous is in an oxidation state selected from: +1, +2, +3, +4, +5, and combinations thereof. In certain embodiments of the first-fifth embodiments disclosed herein, the solution comprises or the degradant comprises at least one phosphorous oxoacid or an ester thereof wherein the phosphorous is in an oxidation state selected from: +3, +5, and combinations thereof. Non-limiting examples of phosphorous oxoacids suitable for use in certain embodiments of the first-fifth embodiments disclosed herein include the following: $H_2PO(OH)_2$ for phosphorous oxoacids with P in +1 oxidation state; $HPO(OH)_2$ and $H_3PO_3$ for phosphorous oxoacids with P in +3 oxidation state; $(OH)_2P(O)—P(O)(OH)_2$ for phosphorous oxoacids with P in +4 oxidation state; $PO(OH)_3$, $(OH)_2(O)P—O—P(O)(OH)_2$, $(OH)_2(O)P—O—P(O)(OH)—O—P(O)(OH)_2$, $H(HPO_3)_mOH$ where m=1-6, and $(P(O)(OH)—O—)_3$ for phosphorous oxoacids with P in +5 oxidation state; and $H(OH)(O)P—O—P(O)(OH)_2$ for phosphorous oxoacids containing P in mixed oxidation states. As well, it should be understood that the foregoing phosphorous oxoacids as well as the esters thereof described below also include compounds where one of the hydrogens directly bonded to a P is replaced with an alkyl group (e.g., $H_3CP(=O)(OCH_3)_3$. Non-limiting examples of phosphorous oxoacids suitable for use in certain embodiments of the first-fifth embodiments disclosed herein can also be described according to their common names and include the following: phosphinic acid (also known as hypophosphorous acid), phosphonic acid (also known as phosphorous acid), phosphoric acid, peroxymonophosphoric acid, pyrophosphoric acid, triphosphoric acid, trimetaphosphoric acid, polyphosphoric acid, hypophosphoric acid, and isohypophosphoric acid. Non-limiting examples of esters of phosphorous oxoacids suitable for use in certain embodiments of the first-fifth embodiments disclosed herein include esters of the foregoing oxoacids, wherein one or more than one OH is replaced with OR wherein each R independently comprises a hydrocarbon group that is saturated (e.g., alkyl) or unsaturated (e.g., containing at least one carbon-carbon double bond or at least one carbon-carbon triple bond) and is linear, branched or cyclic, each of the foregoing optionally substituted with one or more halogen, or an aromatic group or heteroaromatic group optionally substituted with a halogen group (e.g., as a substituent or substituents on the aromatic ring). In certain embodiments of the foregoing embodiments, each R contains 1 to about 53 carbon atoms (with it being understood that unsaturated hydrocarbon moieties of R will contain at least 2 carbon atoms). In certain embodiments of the first-fifth embodiments disclosed herein, the R of each OR comprises an alkyl group (linear, branched or cyclic), optionally substituted with one or more halogen. In certain embodiments of the foregoing, the R alkyl group is selected from C1-C41 (linear, branched or cyclic) and each R group (when more than one is present) may be the same or may be independently selected from C1-C41. It should be understood that the cyclic R groups encompass hydrocarbon cyclic (e.g., cyclopropyl) as well as heteroatom cyclic; as a non-limiting example in ethylene phosphite a cyclic structure is formed from two carbon atoms and two phosphorous-bonded oxygens. In certain embodiments of the first-fifth embodiments disclosed herein, the R of each OR comprises an aromatic or heteroaromatic group selected from C5-C53, optionally substituted with one or more halogen. The esters of phosphorous oxoacids disclosed herein should be considered as including both structures where each R of the OR groups are the same as well as structures wherein each R of the OR groups are independently selected from the foregoing (e.g., hydrocarbon (saturated or unsaturated; linear, cyclic or branched), alkyl, aromatic, heteroaromatic, each optionally substituted with halogen).

In certain embodiments of the first-fifth embodiments disclosed herein, the at least one phosphorous oxoacid or ester thereof comprises an ester of a phosphorous oxoacid which is optionally halogenated. Generally, suitable halogenated esters of phosphorous oxoacids have one or more of the OR groups replaced by a halogen (e.g., chlorine, fluorine, bromine). Non-limiting examples of halogenated esters of phosphorous oxoacids suitable for use in certain embodiments of the methods of the first-fifth embodiments disclosed herein include methyl dichlorophosphite, tris(chloropropyl) phosphate, tris(chloroethyl) phosphate, tris (dichloropropyl) phosphate, bis[2,3-dibromopropyl) phosphate, bis(choloropropyl) monophenyl phosphate, tris (2,2,2-trifluoroethyl) phosphite, bis(2,2-trifluoroethyl) phosphite, tris(1,1,1,3,3,3-hexafluoro-2-propyl) phosphite.

In certain embodiments of the first-fifth embodiments disclosed herein, the at least one phosphorous oxoacid or ester thereof comprises an ester of a phosphorous oxoacid. In certain embodiments of the first-fifth embodiments disclosed herein the at least one ester of a phosphorous oxoacid comprises a monoester, a diester or a triester. In certain embodiments of the first-fifth embodiments disclosed herein, the at least one ester of a phosphorous oxoacid comprises a monoester. In certain embodiments of the first-fifth embodiments disclosed herein, the at least one ester of a phosphorous oxoacid comprises a diester. In certain embodiments of the first-fifth embodiments disclosed herein, the at least one ester of a phosphorous oxoacid comprises a triester. As those of skill in the art will understand, a monoester of a phosphorous oxoacid comprises one OR group (i.e., one OH group replaced with an OR group), a diester of a phosphorous oxoacid comprises two OR groups (i.e., two OR groups each replacing one OH group), and a triester of a phosphorous oxoacid comprises three OR groups (i.e., three OR groups each replacing one OH group).

In certain embodiments of the first-fifth embodiments disclosed herein, the ester of a phosphorous oxoacid comprises a diester wherein each R alkyl group is independently selected from C1-C4 (linear, branched, or cyclic), optionally substituted with halogen. In certain embodiments of the first-fifth embodiments disclosed herein, the at least one ester of a phosphorous oxoacid comprises dimethyl phosphite, diethyl phosphite, di-n-propyl phosphite, di-iso-propyl phosphite, di-iso-butyl phosphite, di-n-butyl phosphite, di-t-butyl phosphite, di-sec-butyl phosphite, diphenyl phosphite, dibenzyl phosphite, bis(2-ethylhexyl) phosphite, di-isodecyl phosphite, di-lauryl phosphite, di-octadecyl phosphite, trimethyl phosphite, triethyl phosphite, tri-n-propyl phosphite, tri-iso-propyl phosphite, tri-iso-butyl phosphite, tri-n-butyl phosphite, tri-t-butyl phosphite, tri-sec-butyl phosphite, triphenyl phosphite, tribenzyl phosphite, tris(2-ethylhexyl) phosphite, tri-isodecyl phosphite, tri-lauryl phosphite, tri-octadecyl phosphite, dimethyl phosphate, diethyl phosphate, di-n-propyl phosphate, di-iso-propyl phosphate, di-iso-butyl phosphate, di-n-butyl phosphate, di-t-butyl phosphate, di-sec-butyl phosphate, diphenyl phosphate, dibenzyl phosphate, bis(2-ethylhexyl) phosphate, di-isodecyl phosphate, di-lauryl phosphate, di-octadecyl phosphate, trimethyl phosphate, triethyl phosphate, tri-n-propyl phosphate, tri-iso-propyl phosphate, tri-iso-butyl phosphate, tri-n-butyl phosphate, tri-t-butyl phosphate, tri-sec-butyl phosphate, triphenyl phosphate, tribenzyl phosphate, tris(2-ethylhexyl) phosphate, tri-isodecyl phosphate, tri-lauryl phosphate, trioctadecyl phosphate. Various esters of phosphorous oxoacids are commercially available for purchase from vendors such as Sigma-Aldrich Corporation (St. Louis, Mo.). As those of skill in the art will understand, phosphites monoesters, diesters, and triesters can be trivially prepared by reacting phosphorous halide with alcohol. More specifically, a phosphite triester is formed by the reaction of phosphorous trichloride with three alcohol molecules, a phosphite diester is formed by the reaction of phosphonous dichloride with two alcohol molecules, and a phosphite monoester is formed by the reaction of phosphinous chloride with one alcohol molecule. The structure of the phosphite ester formed in such a manner can be controlled by selecting the appropriate alcohol.

The use of the phrase "solution comprising at least one phosphorous oxoacid or an ester thereof" is meant to indicate that the solution is in liquid form at the time of applying it to the polyurethane foam inside the tire carcass. Preferably the solution is in a liquid form at 25° C. Suitable solutions for use in the methods of the first and second embodiments and in certain embodiments of the third embodiment disclosed herein and suitable degradants for use in the fourth and fifth embodiments may consist essentially or entirely of the at least one phosphorous oxoacid or an ester thereof. Consist essentially should be understood to include at least 90% by volume, at least 95% by volume, at least 98% by volume, and at least 99% by volume of the at least one phosphorous oxoacid or an ester thereof. Moreover, various phosphorous oxoacids or esters thereof will be available or commercially supplied in various purity grades, most containing 95% or more by of the subject phosphorous oxoacid or ester with the remainder comprising one or more solvents optionally along with minor amounts of other non-subject phosphorous oxoacid or ester thereof. For example, diethyl phosphite in 94% technical grade is available from Sigma-Aldrich Company and is described in its MSDS as containing ethanol in an amount of greater than or equal to 1% and less than 5% (by volume), toluene in an amount greater than or equal to 1% and less than 5% (by volume), triethylphosphate in an amount of greater than or equal to 1% and less than 5% (by volume), and triethyl phosphite in an amount of greater than or equal to 0.1% and less than 1% (by volume). In certain embodiments of the first-fifth embodiments disclosed herein, the solution or the degradant comprises at least one solvent in addition to the at least one phosphorous oxoacid or an ester thereof. In certain such embodiments of the first-fifth embodiments disclosed herein, the solution or the degradant comprises at least one polar solvent in addition to the at least one phosphorous oxoacid or an ester thereof. Non-limiting examples of polar solvents suitable for use in the solutions or the degradant according to certain embodiments of the first-fifth embodiments disclosed herein include methanol, ethanol, acetone, chloroform, dimethylformamide, dimethylsulphoxide, and combinations thereof. Without being bound by theory, it is believed that such solvents may beneficially swell the foam.

Applying to the Polyurethane Foam

As discussed above, according to the methods of the first and second embodiments and in certain embodiments of the methods of the third embodiment disclosed herein, the solution comprising at least one phosphorous oxoacid or an ester thereof is applied to the polyurethane foam inside the rubber carcass of the tire. The amount of solution applied to the polyurethane foam inside the tire carcass may vary depending upon various factors such as the particular phosphorous oxoacid(s) or ester(s) thereof utilized, the particular composition of the polyurethane foam, the overall volume of polyurethane foam inside the tire carcass, the dimensions of the tire (e.g., overall tire diameter, sidewall height, tread width), and the time available for the degradation of the foam to occur. Generally, larger volumes of foam will require larger volumes of solution and relatively larger tires (particularly those having higher sidewall height or wider tread width) may require relatively larger ratios of solution to foam to achieve the same approximate time for degradation. In certain embodiments of the first-third embodiments disclosed herein, the solution is applied to the polyurethane foam inside the rubber carcass in a volume of foam/volume of solution ratio of about 10/1 to about 1/1, including 10/1 to 1/1, about 9/1 to about 1/1, 9/1 to 1/1, about 8/1 to about 1/1, 8/1 to 1/1, about 7/1 to about 1/1, 7/1 to 1/1, about 6/1 to about 1/1, 6/1 to 1/1, about 5/1 to about 1/1, 5/1 to 1/1, about 4/1 to about 1/1, about 9/1 to about 2/1, 9/1 to 2/1, about 8/1 to about 2/1, 8/1 to 2/1, about 7/1 to about 2/1, 7/1 to 2/1, about 6/1 to about 2/1, 6/1 to 2/1, about 5/1 to about 2/1, 5/1 to 2/1, about 4/1 to about 2/1, 4/1 to 2/1, about 9/1 to about 3/1, 9/1 to 3/1, about 8/1 to about 3/1, 8/1 to 3/1, about 7/1 to about 3/1, 7/1 to 3/1, about 6/1 to about 3/1, 6/1 to 3/1, about 5/1 to about 3/1, 5/1 to 3/1, about 4/1 to about 3/1, about 9/1 to about 4/1, 9/1 to 4/1, about 8/1 to about 4/1, 8/1 to 4/1, about 7/1 to about 4/1, 7/1 to 4/1, about 6/1 to about 4/1, 6/1 to 4/1, about 5/1 to about 4/1, and 5/1 to 4/1. In certain embodiments of the first-third embodiments disclosed herein, the solution is applied to the polyurethane foam inside the rubber carcass in a volume/volume ratio of about 5/1 to about 2/1, including 5/1 to 2/1. For purposes of determining the volume of foam inside the rubber carcass, it is intended that the dimensions of the tire can be utilized (e.g., by calculating the volume of a torus having the dimensions of the tire) and the assumption made that the volume inside the rubber carcass is at least 95% filled with foam. The volume ratios provided herein are intended for application by using the density of the at least one phosphorous oxoacid or ester thereof at 25° C. (or the solution comprising the at least one phosphorous oxoacid or ester thereof at 25° C.). In certain embodiments of the first-third embodiments disclosed herein, the amount of degradant in the polyurethane foam is about 50 to about 300% by weight of the polyurethane foam, including 50 to 300%, about 100 to about 300%, 100 to 300%, about 150 to about 300%, or 150 to 300% by weight of the polyurethane foam.

According to the methods of the first and second embodiments disclosed herein and in those embodiments of the methods of the third embodiment utilizing a solution comprising at least one phosphorous oxoacid or ester thereof, the solution comprising at least one phosphorous oxoacid or ester thereof may be applied to the polyurethane foam inside the rubber carcass using various methods. The particular method of application is not especially limited as long as the solution makes contact with the polyurethane foam. In certain embodiments of the first-third embodiments disclosed herein, the solution is injected into the polyurethane foam. In certain embodiments of the first-third embodiments disclosed herein, the solution is added through the tire stem, through the sidewall of the tire, through the tread of the tire, or by a combination thereof. In those embodiments where the solution is added through the sidewall of the tire, it may be added at one or more sidewall locations and each location may be cut, punctured, pierced or some combination thereof to facilitate the addition of the solution. As non-limiting examples, the solution may be injected through the sidewall using a needle, nozzle or other injection device, either through the intact sidewall or through a cut, puncture or other opening added for the purpose of facilitating the addition of the solution to the polyurethane foam. In those embodiments where the solution is added through the tread of the tire, it may be added at one or more tread locations and each location may be cut, punctured, pierced or some combination thereof to facilitate the addition of the solution. As non-limiting examples, the solution may be injected through the tread using a needle, nozzle or other injection device, either through the intact tread or through a cut, puncture or other opening added for the purpose of facilitating the addition of the solution to the polyurethane foam. In certain embodiments of the first-third embodiments disclosed herein, the polyurethane foam inside the rubber carcass is at least partially exposed to the outer environment prior to applying the solution. Various methods of partially exposing the polyurethane foam can be utilized, including cutting, puncturing, or piercing the sidewall or tread of the tire. In certain embodiments of the first-third embodiments, the tire is placed on one side and a cut is made (circumferentially) around at least a majority of the upper side of the tire exposing the polyurethane foam inside; in such embodiments, the lower side of the tire can act as a type of container to collect the degraded foam, thereby containing it or eliminating the need for use of another container to collect the degraded foam.

Heating to Degrade the Foam

As discussed above, the methods of the first-third embodiments include a step of heating to degrade the foam and certain embodiments of the fourth and fifth embodiments may (optionally) include a step of heating to degrade the degradable foam. Heating is useful in the methods of the first-third embodiments (and in certain embodiments of the fourth and fifth embodiments) because most solutions comprising the at least one phosphorous oxoacid or an ester thereof will degrade the polyurethane foam that is inside the rubber carcass only very slowly or not at all at ambient temperatures (e.g., between about 15 and 40° C.). Generally, the heating comprises heating at a temperature above about 40° C., preferably above about 100° C. In certain embodiments of the first-fifth embodiments disclosed herein, the heating comprises heating at about 120 to about 250° C., including 120 to 250° C., about 140 to about 200° C., and 140 to 200° C. Generally, the heating temperatures disclosed herein should be understood as the temperature reached by the combined solution and polyurethane foam such as could be measured by insertion of a thermometer or thermocouple into a portion of the combined solution and polyurethane foam. In certain embodiments of the first-fifth embodiments disclosed herein, the heating comprises heating for about 0.5 to about 10 hours, including 0.5 to 10 hours, about 0.5 hours to about 5 hours, 0.5 hours to 5 hours, about 0.5 hours to about 3 hours, 0.5 hours to 3 hours, about 0.5 hours to about 2 hours, 0.5 hours to 2 hours, about 0.5 hours to about 1 hour, and 0.5 hours to 1 hour, each time period including but not limited to the foregoing heating temperatures. The heating temperature utilized will be somewhat dependent upon the amount of time available for degradation of the polyurethane foam; generally, faster degradation will occur at higher temperatures. According to the first-third embodiments disclosed herein and in certain embodiments of the fourth and fifth embodiments disclosed herein, the heating (including at the foregoing temperatures and/or for the foregoing time periods) may be achieved using various methods, non-limiting examples of which include placing the tire containing solution (degradant) applied to the foam onto a heater, into a heater, under a heater, or applying directed heat to the tire. Non-limiting examples of suitable heaters or heat sources include hot-plate type surfaces, ovens, tire molds, radiant heat sources, and microwaves.

Catalysts and Surfactants

In certain embodiments of the methods according to the first-third embodiments, the solution used to degrade the polyurethane foam includes (further comprises) at least one catalyst, at least one surfactant, or a combination thereof. In certain embodiments of the methods according to the first-third embodiments, the solution used to degrade the polyurethane foam includes (further comprises) at least one catalyst selected from an amine-based catalyst, a tin-based catalyst, a mercury-based catalyst, a lead-based catalyst, a bismuth-based catalyst, a zinc-based catalyst, an aliphatic organic acid, or a combination thereof. Suitable amine-based catalysts include primary, secondary and tertiary amines (e.g., triethylenediamine, N,N,N',N'',N'''-pentamethyldiethylenetriamine, 1,4-diazabicyclo[2.2.2]octane, azobiisobutyronitrile, dimethylcyclohexylamine (DMCHA), and dimethylethanolamine (DMEA)). Carboxylates, oxides and mercaptide oxides of tin, mercury, lead, bismuth, and zinc may be useful catalysts. In particular, alkyl tin carboxylates (e.g., dibutyltin dilaurate) may be useful catalysts. In certain embodiments of the methods according to the first-third embodiments, the solution used to degrade the polyurethane foam includes (further comprises) at least one surfactant. Suitable surfactants include nonionic surfactants, silicone surfactants, and quaternary ammonium salts. Suitable nonionic surfactants include fatty alkanolamides; fatty alcohol ethylene oxide; polyoxyethylene fatty acid ester; polyethylene glycol oleate; polyoxyethylene alkyl phenol; ethanolamide fatty acid condensate; polyoxyethylene propylene glycol monostearate; iso-octyl phenoxy polyoxyethylene ethanol; nonylphenol polyglycol ether alcohol; alkylphenol ethylene oxide condensate; alkyl aryl polyether alcohol; aromatic polyglycol ether condensate; polyethylene glycol esters of fatty acids; aliphatic polyoxyethylene ether alcohol; alkoxy polyoxyethylene ethanol; polyoxyethylene ester; alkyl aryl polyethylene glycol ether; alkyl aryl ether; and combinations thereof. Suitable silicone surfactants include silicone oils, siloxane oxyalkylene block copolymers, nonhydrolyzable silicon-glycol copolymers, siloxane-polyether urethane copolymers, and combinations thereof. In certain embodiments of the methods of the first-third embodiments disclosed herein, the at least one catalyst, at least one surfactant, or a combination thereof is added to the solution prior to applying the solution to the foam. In other embodiments of the methods of the first-third embodiments disclosed herein, the at least one catalyst, at least one surfactant, or a combination thereof is applied to the foam along with the solution, but can be considered to be a part of the solution due to combination (mixing) after application to the foam. In certain embodiments of the fourth and fifth embodiments disclosed herein, it is contemplated that at least one catalyst could be added to the degradable foam prior to degrading it (e.g., such as by the methods discussed above for adding at least one phosphorous oxoacid or an ester thereof to the tire.

Separating the Wheel from the Rubber Carcass

As discussed above, the methods of the second and third embodiments disclosed herein comprises a method for separating a wheel from a mounted polyurethane foam-containing tire or a mounted polyurethane foam and degradant-containing tire and practice of the method allows for ultimate separation of the wheel from the rubber carcass. The method of the first embodiment disclosed herein, i.e., for degrading polyurethane foam from inside of a mounted tire, as well as the method of the fourth embodiment disclosed herein, i.e., for preparing a degradable foam-containing tire, may also (optionally) include a step of separating the wheel from the rubber carcass. When the mounted tire contains polyurethane foam or degradable foam inside the rubber carcass, separation of the wheel from the rubber carcass (and the foam) without damaging the wheel can be difficult. An undamaged wheel is desirable because it can be re-used (re-mounted) with another tire. Separation of the wheel from the rubber carcass is possible once the polyurethane foam has been degraded according to the methods of the first-third embodiments disclosed herein.

In certain embodiments of the first-fifth embodiments disclosed herein, the method includes (further comprises) cleaning of the wheel after the polyurethane foam has been degraded and prior to re-mounting the wheel with another tire. Various types of cleaning may be utilized, including but not limited to, washing (e.g., with a liquid), wiping (e.g., with a cloth) and combinations thereof.

Methods for Preparing a Degradable Foam-Containing Tire

As discussed above, according to the fourth embodiment disclosed herein, a method for preparing a degradable foam-containing tire is provided. The method comprises providing a tire comprising at least a wheel, a rubber carcass, and a valve stem; combining ingredients comprising: (i) at least one di- or polyisocyanate, (ii) at least one polyol, and (iii) a degradant comprising at least one phosphorous oxoacid or an ester thereof; and adding the combined ingredients into the rubber carcass through the valve stem, whereby the added combined ingredients form a degradable foam-containing tire comprising foam that is capable of degradation upon heating to a temperature above about 120° C. In certain embodiments, the methods of the fourth embodiment can be described as a method for preparing a mounted degradable foam-containing tire, and the tire that is provided comprises at least one wheel, a rubber carcass and a valve stem wherein the rubber carcass is mounted on the wheel. The methods of the fourth embodiment include incorporation of a degradant in the form of at least one phosphorous oxoacid or an ester thereof into the polyurethane foam during its formation, forming what can be described as a "degradable foam" or alternatively a "degradable polyurethane foam." In certain embodiments of the methods of the fourth embodiment, the at least one polyol is utilized in an amount of 100 parts, the at least one di- or polyisocyanate is used in an amount of about 50 to about 120 parts (including 50-120 parts, about 50 to about 100 parts, and 50 to 100 parts), and the degradant is used in an amount of about 50 to about 200 parts (including 50-200 parts, about 50 to about 150 parts, and 50-150 parts). As non-limiting examples within the foregoing ranges, when the at least one polyol is utilized in an amount of 100 parts, the at least one di- or polyisocyanate could be used in an amount of 50 parts, 60 parts, 70 parts, 80 parts, 90 parts, 100 parts, 110 parts, or 120 parts, and the degradant could be used in an amount of 50 parts, 60 parts, 70 parts, 80 parts, 90 parts, 100 parts, 110 parts, 120 parts, 130 parts, 140 parts, 150 parts, 160 parts, 170 parts, 180 parts, 190 parts, or 200 parts. The particular type of at least one di- or polyisocyanate, at least one polyol, and at least one phosphorous oxoacid or an ester thereof utilized in the methods of the fourth embodiment disclosed herein is as discussed above and should be considered to be applicable to the methods of the fourth embodiment as is fully set forth herein.

The description of the degradable foam of the fourth embodiment as being capable of degradation upon heating to a temperature above about 120° C. should be understood to be a property of the degradable foam rather than a process limitation. Moreover, for purposes of determining whether a particular foam is capable of degradation upon heating to a temperature above about 120° C. a 100 gram sample of the foam should be utilized with heating to 120° C. for 5 hours. It should be understood that foams having the property of being capable of degradation upon heating to a temperature above about 120° C. may also be more quickly degradable at higher temperatures and/or more slowly degradable at lower temperatures. In certain embodiments, upon performing the foregoing heating, the foam sample will become pourable. Alternatively or additionally, in certain embodiments upon performing the foregoing heating, the degraded foam sample will have a molecular weight of less than 50,000 (as analyzed by GPC).

Tire Containing Degradable Foam

As discussed above, according to the fifth embodiment disclosed herein, a tire containing degradable foam is provided. The tire comprises (a) a wheel, a rubber carcass comprising at least a tread portion and a sidewall portion, and optionally a valve stem, and (b) degradable foam comprised of a combination of at least one di- or polyisocyanate, at least one polyol, and a degradant comprising at least one phosphorous oxoacid or an ester thereof, the degradable foam contained in the interior of the rubber carcass, wherein the degradable foam is capable of degradation upon heating to a temperature above about 120° C. According to the fifth embodiment, the degradant in the form of at least one phosphorous oxoacid or an ester thereof has been incorporated into the polyurethane foam during its formation, forming what can be described as a "degradable foam" or alternatively a "degradable polyurethane foam." In certain embodiments, the tire of the fifth embodiment can be described as a mounted tire containing degradable foam, wherein the rubber carcass is mounted on the wheel. In certain embodiments of the fifth embodiment, when the at least one polyol is present in an amount of 100 parts, the at least one di- or polyisocyanate is used in an amount of about 50 to about 120 parts (including 50-120 parts, about 50 to about 100 parts, and 50 to 100 parts), and the degradant is used in an amount of about 50 to about 200 parts (including 50-200 parts, about 50 to about 150 parts, and 50-150 parts). As non-limiting examples within the foregoing ranges, when the at least one polyol is utilized in an amount of 100 parts, the at least one di- or polyisocyanate could be used in an amount of 50 parts, 60 parts, 70 parts, 80 parts, 90 parts, 100 parts, 110 parts, or 120 parts, and the degradant could be used in an amount of 50 parts, 60 parts, 70 parts, 80 parts, 90 parts, 100 parts, 110 parts, 120 parts, 130 parts, 140 parts, 150 parts, 160 parts, 170 parts, 180 parts, 190 parts, or 200 parts. The particular type of at least one di- or polyisocyanate, at least one polyol, and at least one phosphorous oxoacid or an ester thereof utilized in the degradable foams of the fifth embodiment disclosed herein is as discussed above and should be considered to be applicable to fifth embodiment as is fully set forth herein.

The description of the degradable foam of the fifth embodiment as being capable of degradation upon heating to a temperature above about 120° C. should be understood to be a property of the degradable foam rather than a process limitation. Moreover, for purposes of determining whether a particular foam is capable of degradation upon heating to a temperature above about 120° C. a 100 gram sample of the foam should be utilized with heating to 120° C. for 5 hours. It should be understood that foams having the property of being capable of degradation upon heating to a temperature above about 120° C. may also be more quickly degradable at higher temperatures and/or more slowly degradable at lower temperatures. In certain embodiments, upon performing the foregoing heating, the foam sample will become pourable. Alternatively or additionally, in certain embodiments upon performing the foregoing heating, the degraded foam sample will have a molecular weight of less than 50,000 (as analyzed by GPC).

Use of the Disclosed Methods on Unmounted Tires

In addition to being utilized upon a mounted polyurethane foam-containing tire or a mounted polyurethane foam and degradant-containing tire, the methods of the first-third embodiments disclosed herein, including the entire descriptions thereof, can also be used upon an unmounted tire wherein the unmounted tire comprises a rubber carcass having polyurethane foam inside or upon a wheel with polyurethane foam attached thereto. Such an unmounted tire may be a previously mounted polyurethane foam-containing tire that has had its wheel separated by other means (e.g., mechanical cutting) or a tire that had polyurethane added but was never mounted onto a wheel. A wheel with polyurethane foam attached thereto may be a wheel that had a mounted polyurethane foam-containing tire separated by mechanical means but that requires removal of residual polyurethane foam prior to being suitable for re-mounting of another tire. The methods of the first-third embodiments as disclosed and described herein may be utilized in all their permutations and combinations with either an unmounted tire or a wheel with polyurethane foam or polyurethane foam with degradant attached thereto.

EXAMPLES

The following example illustrates one specific and exemplary embodiment and/or certain features of the embodiments of the present disclosure. The example is provided solely for the purposes of illustration and should not be construed as limiting the present disclosure. Numerous variations over the specific example are possible without departing from the spirit and scope of the presently disclosed embodiments.

Example 1: A sample of polyurethane foam weighing 100 grams was obtained; the sample had been cut from a used pneumatic tire that had been filled with the polyurethane foam and utilized on a vehicle. The polyurethane foam sample was black in color and generally non-compressible by hand-squeezing. The polyurethane foam sample was added to a flask. Thereafter, 20 grams of dimethyl phosphite (98% purity, obtained from Sigma Aldrich Corporation) was added to the flask and the contents swirled occasionally before heating the flask to 150-160° C. for 1 hour using a hot plate with a silicone oil bath. After heating, the foam had degraded into a pourable liquid that was black in color and contained some solid powder-like material (believed to be carbon black filler) at the bottom of the flask. After cooling to room temperature, the contents of the flask remained liquid and pourable. According to analysis by GPC (polystyrene standard), the contents had a bimodal distribution with Mn (number average molecular weight) of 10,300 grams/mole and 31,064 grams/mole. The molecular weight of the material before treatment could not be determined because it was not dissolvable in available solvents.

This application discloses several numerical range limitations that support any range within the disclosed numerical ranges, even though a precise range limitation may not be stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g.,"a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire containing degradable foam, the tire comprising:
   a. a wheel, a rubber carcass comprising at least a tread portion and a sidewall portion, and optionally a valve stem, and
   b. degradable foam comprised of a combination of at least one di- or polyisocyanate, at least one polyol, and a degradant comprising at least one phosphorous oxoacid or an ester thereof, the degradable foam contained in the interior of the rubber carcass, wherein the degradable foam is capable of degradation upon heating to a temperature above 120° C.

2. The tire of claim 1, wherein the at least one phosphorous oxoacid or an ester thereof comprises an optionally halogenated ester having an ester functionality which comprises an alkyl group each independently selected from C1-C41 optionally substituted with one or more halogen, or an aromatic or heteroaromatic group selected from C5-C53 optionally substituted with one or more halogen.

3. The tire of claim 1, wherein the at least one phosphorous oxoacid or an ester thereof comprises a compound with phosphorus in oxidation state +3, oxidation state +5, or a combination thereof.

4. The tire of claim 1, wherein the at least one phosphorous oxoacid or an ester thereof comprises an ester.

5. The tire of claim 4, wherein the ester of the at least one phosphorous oxoacid is halogenated.

6. The tire of 4, wherein the ester comprises at least one of:
   a. a diester;
   b. a monoester; or
   c. a triester.

7. The tire of claim 4 wherein each ester functionality comprises an alkyl group each independently selected from C1-C41 optionally substituted with one or more halogen, or an aromatic or heteroaromatic group selected from C5-C53 optionally substituted with one or more halogen.

8. The tire of claim 1, wherein the at least one phosphorous oxoacid or ester thereof comprises dimethyl phosphonate, diethyl phosphonate, or a combination thereof.

9. The tire of claim 1, wherein the degradable foam is capable of degradation upon heating to a temperature of 140 to 200° C.

10. A tire containing degradable foam, the tire comprising:
    a. a wheel, a rubber carcass comprising at least a tread portion and a sidewall portion, and optionally a valve stem, and
    b. degradable foam comprised of a combination of at least one di- or polyisocyanate, at least one polyol, and a degradant comprising at least one ester of a phosphorous oxoacid, the degradable foam contained in the interior of the rubber carcass, wherein the degradable foam is capable of degradation upon heating to a temperature above 120° C.
    wherein the at least one ester of a phosphorous oxoacid has an ester functionality comprising an alkyl group each independently selected from C1-C41, or an aromatic or heteroaromatic group selected from C5-C53.

11. The tire of claim 10, wherein the at least one ester of a phosphorous oxoacid is halogenated.

12. The tire of claim 10, wherein the at least one ester of a phosphorous oxoacid comprises a compound with phosphorus in oxidation state +3, oxidation state +5, or a combination thereof.

13. The tire of claim 10, wherein the at least one ester of a phosphorous oxoacid comprises at least one of:
    a. a diester;
    b. a monoester; or
    c. a triester.

14. The tire of claim 10 wherein each ester functionality of the at least one ester of a phosphorous oxoacid comprises an alkyl group each independently selected from C1-C4.

15. The tire of claim 10, wherein the degradable foam is capable of degradation upon heating to a temperature of 140 to 200° C.

16. The tire of claim 15, wherein the at least one ester of a phosphorous oxoacid comprises dimethyl phosphonate, diethyl phosphonate, or a combination thereof.

17. A tire containing degradable foam, the tire comprising:
    a. a wheel, a rubber carcass comprising at least a tread portion and a sidewall portion, and optionally a valve stem, and
    b. degradable foam comprised of a combination of at least one di- or polyisocyanate; at least one polyol; and a degradant comprising at least one phosphorous oxoacid or an ester thereof selected from the group consisting of dimethyl phosphonate, diethyl phosphonate, and combinations thereof, the degradable foam contained in the interior of the rubber carcass,
    wherein the degradable foam is capable of degradation upon heating to a temperature above 120° C.

18. The tire of claim 17, wherein the degradable foam further comprises at least one filler and at least one oil.

19. The tire of claim 17, wherein the degradable foam is capable of degradation upon heating to a temperature of above 120 to 250° C.

20. The tire of claim 10, wherein the degradable foam is capable of degradation upon heating to a temperature of 140 to 200° C.

* * * * *